United States Patent [19]

Gorove

[11] 4,389,687

[45] Jun. 21, 1983

[54] EXHAUST AIR VALVE FOR MAGNETIC DISK DRIVES

[75] Inventor: Arpad Gorove, Boulder, Colo.

[73] Assignee: Storage Technology Corporation, Louisville, Colo.

[21] Appl. No.: 246,923

[22] Filed: Mar. 23, 1981

[51] Int. Cl.³ .............................................. G11B 23/02
[52] U.S. Cl. ....................................... 360/98; 360/133
[58] Field of Search ................... 360/98, 97, 99, 86, 360/133; 206/444

[56] References Cited

U.S. PATENT DOCUMENTS 4,054,931 10/1977 Bolton et al. ........................... 360/97
4,282,554 8/1981 Ho et al. ................................. 360/97
4,329,722 5/1982 West ...................................... 360/98

OTHER PUBLICATIONS

IBM Tech. Disc. Bull., S. E. Wheeler, Atmospheric Pressure Compensator for Disk Files, vol. 20, No. 5, Oct. 1977, pp. 1891-1892.

*Primary Examiner*—Alfred H. Eddleman
*Attorney, Agent, or Firm*—Woodcock, Washburn, Kurtz, Mackiewicz & Norris

[57] ABSTRACT

A magnetic disk drive has an improved air exhaust valve positioned over the outlet for pressurized air from the enclosure for the head disk assembly. The valve includes an elliptical housing having one closed face with the other open face being positioned over the air outlet. Ports are positioned along the minor diameter of the elliptical housing. An elastic band, which otherwise seals the ports, is distended by air pressure.

6 Claims, 4 Drawing Figures

U.S. Patent    Jun. 21, 1983    Sheet 3 of 3    4,389,687 ic band 34 in constant engagement with the major diameter of the housing. Pressurized air escaping from the housing forces the elastic band 34 gradually toward the center of the minor diameter of the elliptical member. This eliminates the vibration of the edges of the elastic band 34 and assures a smoother air flow. Because of this, a more effective pressure compensated system is achieved.

EXHAUST AIR VALVE FOR MAGNETIC DISK DRIVES

BACKGROUND OF THE INVENTION

This invention relates to magnetic disk drives and more particularly to an improved exhaust valve for releasing pressurized air from the enclosure of a magnetic disk drive.

Magnetic disk drives are extensively used in digital data processing systems. Examples of high capacity magnetic disk drives include the 8350 disk drive available from Storage Technology Corporation, Louisville, Colo., and the 3350 disk drive available from IBM Corporation, Armonk, N.Y. These disk drives include stacks of rotating magnetic disks with magnetic read/write heads which are positioned over the surfaces of the disks to read and write digital data in magnetic form on the disks. These mechanisms have an extremely high speed of operation. The mechanism tolerances in the positioning of the heads and the disks is critical. Even small particles of dust can cause a malfunction of the machine. Because of this, the head disk assemblies are maintained in a pressurized enclosure. Clean filtered air is continuously supplied to the enclosure to maintain a positive pressure in the enclosure. This prevents the entry of dust and dirt into the enclosure. An exhaust valve is provided for these disk drives. This valve serves the function of releasing pressurized air, maintaining a relatively constant pressure in the enclosure, and closing the exit port when pressure is lost so that no dirt or dust enters through that opening. The prior art exhaust valve in these machines includes a "trap door" which is biased to the closed position but which opens to release pressurized air.

While the prior art air exhaust valves have operated satisfactorily in these disk drives, there is need for improvement, particularly in the reliability of maintaining substantially constant pressure, maintenance required, cost, and positive prevention of back flow of contaminated air into the head disk assembly enclosure.

SUMMARY OF THE INVENTION

In accordance with the present invention, an air exhaust valve for a magnetic disk drive includes an elliptical housing having ports in the body thereof. A thin elastic band is positioned over the body of the housing in engagement with the ports. Pressurized air escapes from the enclosure through the ports by expansion of the elastic band. When the pressure is lost in the enclosure, the elastic band tightly engages the housing to prevent contaminating air entering the enclosure.

In accordance with an important aspect of the invention, the ports are positioned along the minor diameter of the elliptical housing. The elastic band is in constant position and tension against the major diameter of the housing. This forces the air exhaust gradually toward the center of the minor diameter of the elliptical member. This eliminates the vibration of the edges of the elastic band and assures a smoother air flow. Because of this, a more effective pressure compensated system is achieved.

It is an object of the invention to provide an air exhaust valve having no moving parts and having a reduced number of parts compared to prior art valves.

It is another object of this invention to provide an air exhaust valve of reduced cost because of the simplicity of construction.

It is another object of this invention to provide improved pressure regulation in the head disk assembly enclosure.

It is another object of this invention to provide an air exhaust valve with reduced assembly time.

It is another object of the invention to eliminate the adjustments which are required in the air exhaust valve.

It is another object of the invention to provide an air exhaust valve with loose tolerances thereby reducing the inspection and quality control time.

It is another object of the present invention to positively prevent backflow of contaminated air into the head disk assembly enclosure.

It is another object of the present invention to provide an exhaust valve which can be easily and inexpensively changed to maintain different pressure levels in the enclosure.

The foregoing and other objects, features and advantages of the invention will be better understood from the following more detailed description and appended claims.

SHORT DESCRIPTION OF THE DRAWINGS

FIG. 3 shows the air exhaust valve of this invention; and

DESCRIPTION OF THE PREFERRED EMBODIMENT

Figure 1:
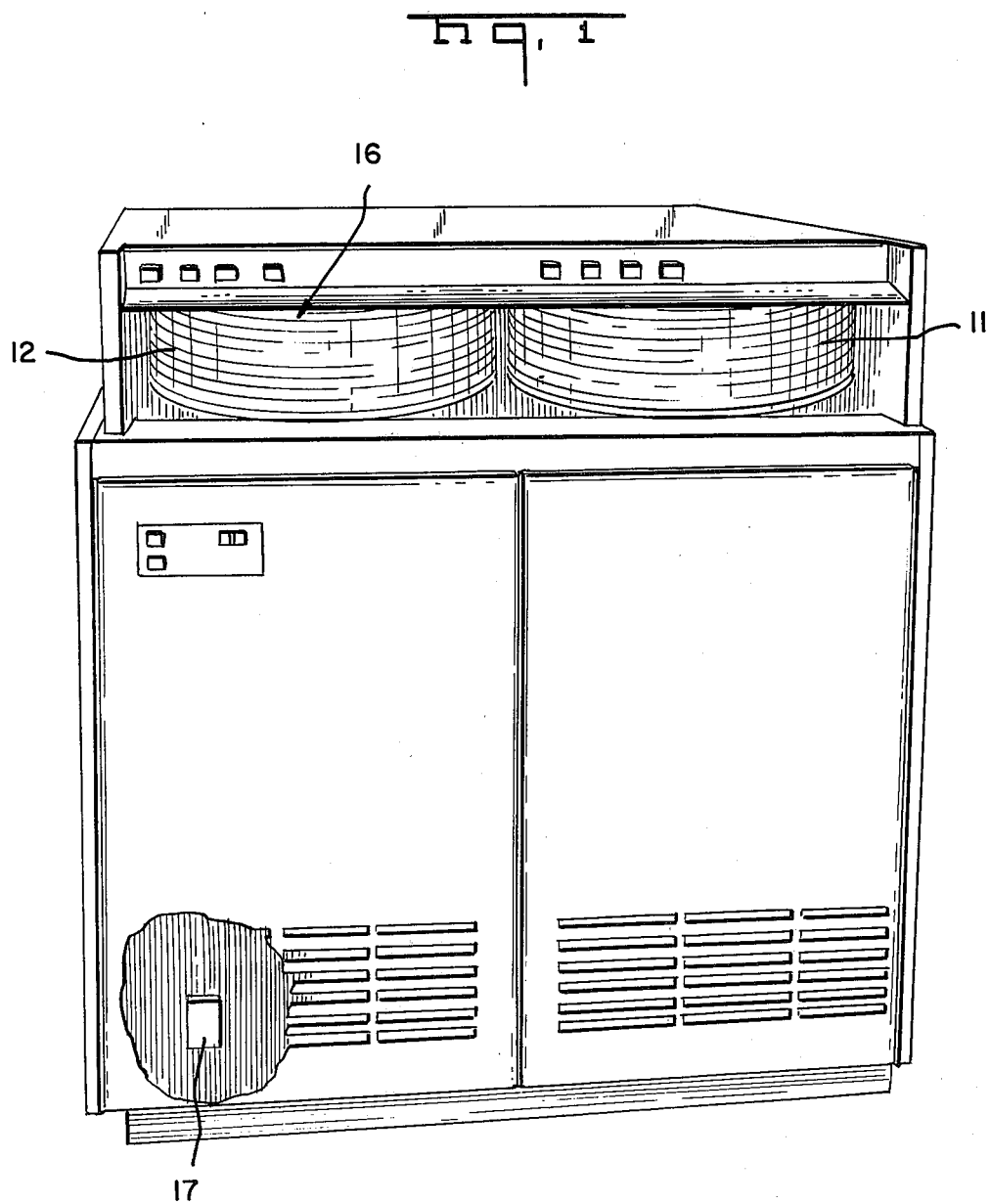
FIG. 1 is a front view of a magnetic disk drive.
Figure 2:
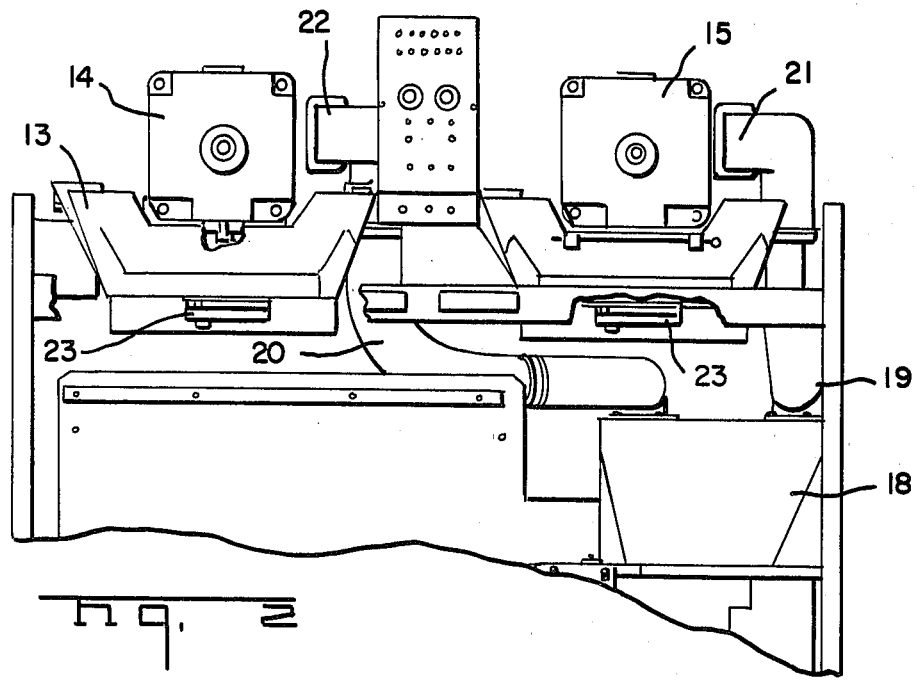
FIG. 2 is a view from the rear of the magnetic disk drive.
Figure 7:
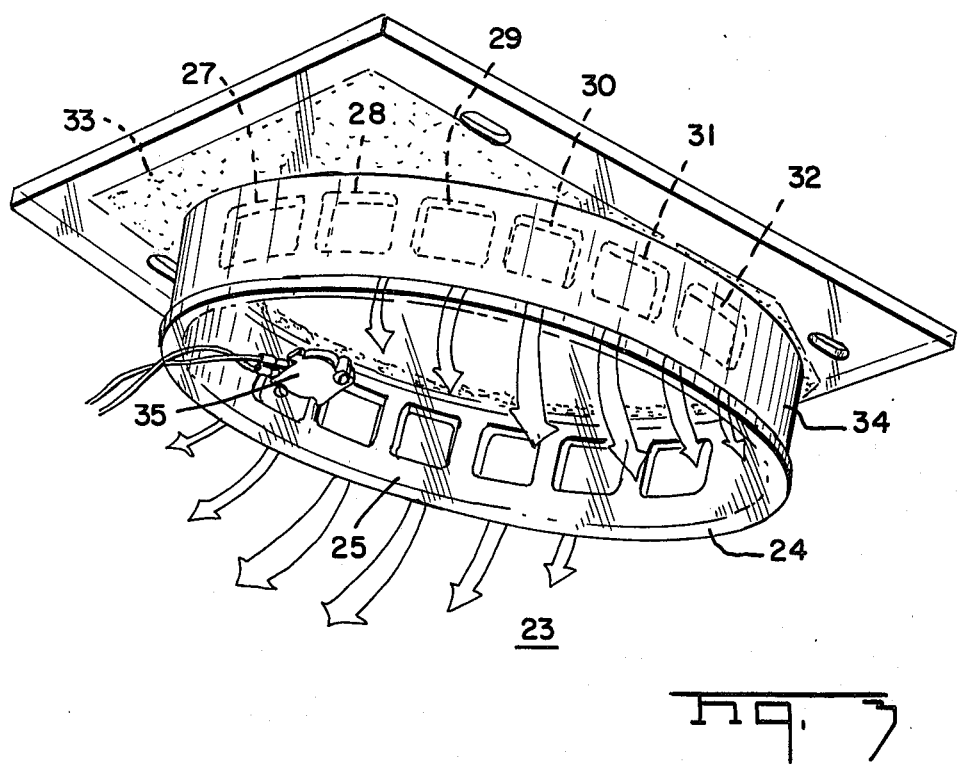

FIGS. 1 and 2 show a magnetic disk drive of the type which includes stacks of magnetic disks 11 and 12 which are rotatable on spindles mounted on a base plate 13 (FIG. 2). Magnetic heads (not shown) ride on a thin film of air over the surfaces of the disks. Linear actuator motors 14 and 15 actuate the heads to move them into read/write relationship with the magnetic disks. The entire head-disk assembly is enclosed in an airtight enclosure which includes the shroud 16. A pump 17 draws air through the filter 18. This air is pushed through ducts 19 and 20 to supply air to the enclosure through the inlets at 21 and 22. This source of air maintains the enclosure under pressure. This pressurized air escapes from the enclosure through the linear actuator, base plate and the exhaust valve 23 of this invention.

This exhaust valve is shown in more detail in FIG. 3. It includes an elliptical housing 24, with the bottom face 25 closed and the other open face is positioned over the air outlet 26 (FIG. 4) in the bottom of the base plate. The body of the elliptical housing has ports 27–32 along the minor diameter. The other side of the housing has similar ports along the minor diameter.

Figure 4:
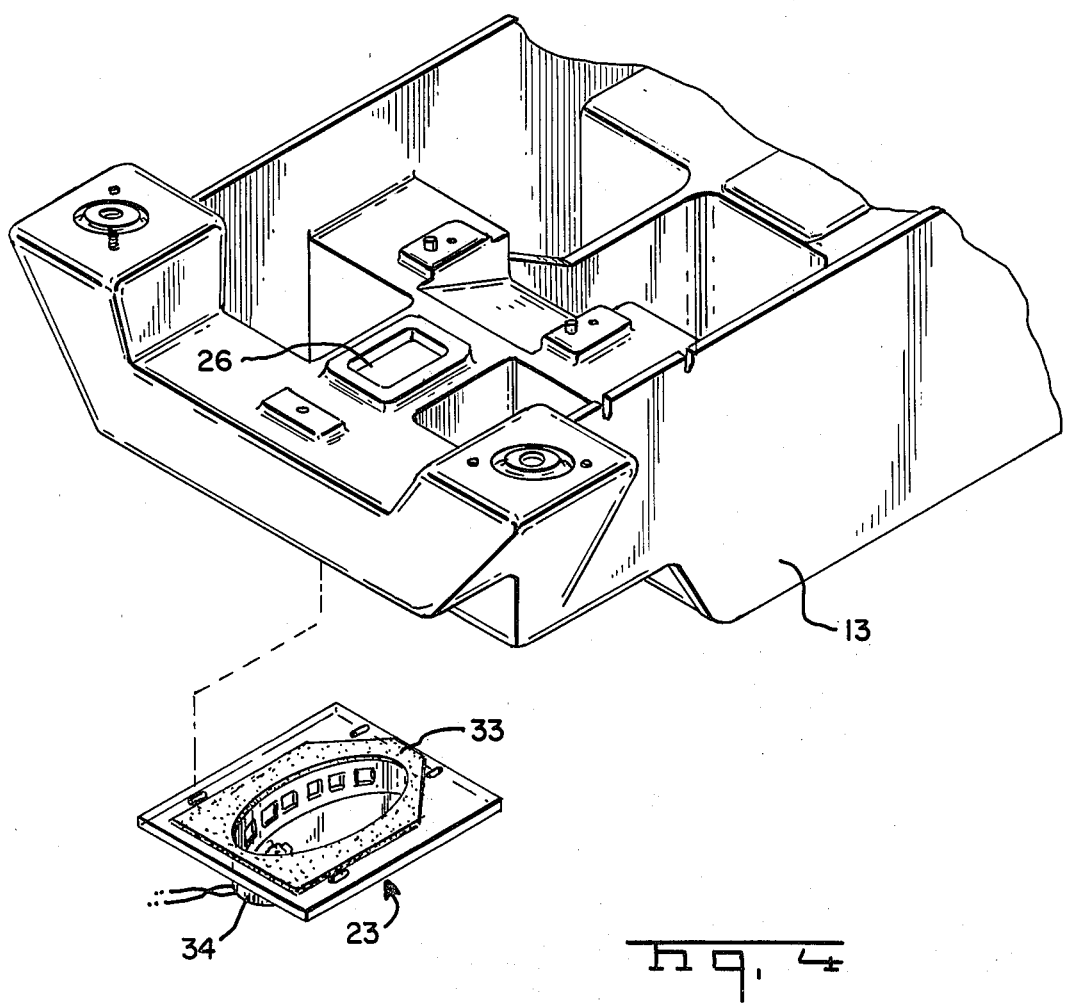
FIG. 4 shows the position of the air exhaust valve on the base plate.

As is best shown in FIG. 4, the exhaust valve 23 has a gasket 33 which is positioned against the bottom of the base plate so that the exhaust valve is tightly sealed against the enclosure.

An elastic band 34 is positioned over the body of the housing in engagement with the ports. Pressurized air distends the elastic band 34 along the minor diameter thereof to allow pressurized air to escape through the ports. The elastic band is maintained in tension against the major diameter of the housing. This keeps the elastic band in a constant position and it suppresses vibrations of the elastic band which might otherwise occur. It has been found that an elastic band made of EPDM (ethylene propylene) elastomer is suitable for use in this invention.

A pressure actuated switch 35 is mounted on the closed face of the housing. This switch is actuated when pressure is lost in the enclosure. This signals a condition in which the disk drive is inoperable and it is shut down.

In operation, the elastic band expands slightly under air pressure to allow the air to escape through the ports 27-32 in the sides of the housing. The elastic band 34 tightly closes the ports when there is no pressure in the enclosure. This prevents air from carrying dust particles through these ports into the head disk assembly enclosure. The pressure maintained inside the enclosure is easily changed by changing the band. Where the circumference of the band is slightly larger, a lower pressure will be maintained and vice versa.

While a particular embodiment of the invention has been shown and described, modifications are within the true spirit and scope of the invention. The appended claims are, therefore, intended to cover all such modifications.

I claim:
1. In a magnetic disk drive comprising:
   a plurality of rotatable magnetic disks;
   magnetic heads riding over the surfaces of said disks;
   an airtight enclosure for said heads and disks;
   a source of pressurized air for said enclosures;
   an improved air exhaust valve positioned over the outlet for pressurized air from said enclosure including:
   an elliptical housing, one face of said housing being closed, the other face of said housing being open and being positioned over said outlet, the body of said elliptical housing having ports therein; and
   an elastic band positioned over the body of said housing in engagement with said ports so that pressurized air escapes from said enclosure through said ports by expansion of said elastic band which otherwise seals said ports.

2. The air exhaust valve recited in claim 1 wherein said ports are positioned along the minor diameter of said elliptical housing, said elastic band having a major diameter tightly tensioned against the major diameter of said housing when it is pressurized to suppress vibration of the edges of said elastic band.

3. The air exhaust valve recited in claim 1 further comprising:
   a pressure actuated switch mounted on the closed face of said housing, said switch being actuated upon loss of pressure to signal a condition in which said disk drive is inoperable.

4. The air exhaust valve recited in claim 1 wherein said enclosure includes a base plate upon which said magnetic disks are mounted for rotation; and
   a shroud positioned over said magnetic disks to form said enclosure.

5. The air exhaust valve recited in claim 1 wherein said elastic band is elliptical.

6. The air exhaust valve recited in claim 1 wherein said elastic band has a circumference which determines the pressure of the air maintained in said enclosure.

* * * * *

UNITED STATES PATENT AND TRADEMARK OFFICE
CERTIFICATE OF CORRECTION

PATENT NO. : 4,389,687
DATED : June 21, 1983
INVENTOR(S) : Arpad Gorove

It is certified that error appears in the above-identified patent and that said Letters Patent are hereby corrected as shown below:

Column 1, line 21, delete "mechanism" and insert
--mechanical--

Signed and Sealed this

Twenty-third Day of August 1983

[SEAL]

Attest:

GERALD J. MOSSINGHOFF

Attesting Officer — Commissioner of Patents and Trademarks